(12) United States Patent
Kulkarni et al.

(10) Patent No.: US 11,727,126 B2
(45) Date of Patent: Aug. 15, 2023

(54) METHOD AND SERVICE TO ENCRYPT DATA STORED ON VOLUMES USED BY CONTAINERS

(71) Applicant: Avaya Management L.P., Santa Clara, CA (US)

(72) Inventors: Prasanna Kulkarni, Pune (IN); Nayana Teja Avatapalli, Eluru (IN)

(73) Assignee: Avaya Management L.P., Santa Clara, CA (US)

( * ) Notice: Subject to any disclaimer, the term of this patent is extended or adjusted under 35 U.S.C. 154(b) by 465 days.

(21) Appl. No.: 16/843,689

(22) Filed: Apr. 8, 2020

(65) Prior Publication Data
US 2021/0319114 A1 Oct. 14, 2021

(51) Int. Cl.
*G06F 21/60* (2013.01)
*G06F 9/54* (2006.01)
*G06F 9/455* (2018.01)
*G06F 9/445* (2018.01)
*H04L 9/40* (2022.01)

(52) U.S. Cl.
CPC ........ *G06F 21/602* (2013.01); *G06F 9/44526* (2013.01); *G06F 9/45558* (2013.01); *G06F 9/547* (2013.01); *H04L 63/0471* (2013.01); *G06F 2009/45583* (2013.01); *G06F 2009/45587* (2013.01)

(58) Field of Classification Search
CPC ............................ G06F 21/602; H04L 63/0471
See application file for complete search history.

(56) References Cited

U.S. PATENT DOCUMENTS

| 7,865,741 | B1* | 1/2011 | Wood | G06F 21/606 |
| | | | | 713/153 |
| 9,817,675 | B1* | 11/2017 | Katchapalayam | H04L 9/083 |
| 10,848,468 | B1* | 11/2020 | Lakshman | G06F 9/45558 |
| 2003/0097574 | A1* | 5/2003 | Upton | G06F 9/542 |
| | | | | 713/183 |
| 2007/0180509 | A1* | 8/2007 | Swartz | G06F 9/4406 |
| | | | | 726/9 |
| 2009/0190760 | A1* | 7/2009 | Bojinov | G06F 3/0676 |
| | | | | 380/269 |
| 2014/0149604 | A1* | 5/2014 | Baig | H04L 63/0876 |
| | | | | 709/245 |
| 2014/0366155 | A1* | 12/2014 | Chang | H04L 67/1097 |
| | | | | 726/27 |
| 2017/0323114 | A1* | 11/2017 | Egorov | H04L 63/0435 |

(Continued)

OTHER PUBLICATIONS

"Administering VMware vSAN," VMware, Inc., Aug. 2019, Version 6.7, 95 pages [retrieved online from: https://docs.vmware.com/en/VMware-vSphere/6.7/vsan-673-administration-guide.pdf].

*Primary Examiner* — Jason Chiang
(74) *Attorney, Agent, or Firm* — Sheridan Ross P.C.

(57) ABSTRACT

A method and service to encrypt data at rest on disks that are managed by a container orchestrator (CO) using a container storage interface (CSI). The method and service including intercepting a request transferred from a CO to a CSI plugin and sending the intercepted request to an encryption proxy plugin. The method and service also including examining the request to determine if encryption is needed. In response to encryption being needed, performing encryption on the volume. The method and service also transferring the intercepted request to the container storage interface plugin.

20 Claims, 8 Drawing Sheets

(56) References Cited

U.S. PATENT DOCUMENTS

| | | | |
|---|---|---|---|
| 2019/0034645 A1* | 1/2019 | El-Moussa | G06F 21/6218 |
| 2020/0004451 A1* | 1/2020 | Prohofsky | G06F 3/0604 |
| 2020/0042214 A1* | 2/2020 | Chen | G06F 3/0632 |
| 2020/0226107 A1* | 7/2020 | Dixit | G06F 16/1752 |
| 2020/0356498 A1* | 11/2020 | Shtivelman | G06F 13/1668 |
| 2021/0089220 A1* | 3/2021 | Gkoulalas-Divanis | G06F 3/0679 |
| 2021/0109683 A1* | 4/2021 | Cain | G06F 3/067 |
| 2021/0203542 A1* | 7/2021 | Deshmukh | H04L 67/025 |

* cited by examiner

METHOD AND SERVICE TO ENCRYPT DATA STORED ON VOLUMES USED BY CONTAINERS

FIELD OF THE DISCLOSURE

The present disclosure is generally towards encrypting data stored on volumes and more particularly toward encryption of data at rest on disks that are managed by a container orchestrator (CO) using a container storage interface (CSI).

BACKGROUND

In traditional deployment, applications were run on physical servers, this was an inefficient use of resources and not very scalable. After traditional deployment, organizations moved to virtualized deployment, where multiple virtual machines (VMs) were run on a single physical server. Virtualization allowed applications to be isolated between virtual machines and offered improved resource utilization and scalability. However, each virtual machine was a full machine running its own components, including its own Operating System (OS), on top of the virtualized hardware.

In computing, namespacing allows the isolation of resources per process or a group of processes. Control groups limit the amount of resources used per process or group of processes (e.g., bandwidth). Containers are an operating system independent software method to perform a similar function to namespacing and control groups. That is to say, containers are a software method to package code and all its dependencies for an application. In other words, an application or process has a specific grouping of resources assigned to it. Containers are similar to virtual machines but share the OS among applications. A container has its own filesystem, CPU, memory, process space, etc., decoupled from the underlaying infrastructure such that the containers are portable across clouds and OS distributions. When containers need to access data, the data may be stored in volumes that are mounted to the node/device. The same data may be accessed by multiple different containers one the same or different nodes.

A container storage interface enables storage vendors to develop a single plugin that works across a number of container orchestration systems.

Data encryption is the process of encoding data such that only authorized parties can access it. Encrypted data can only be accessed/decrypted using the correct encryption key. Encrypted data is not accessible without permission (e.g., without the proper key).

SUMMARY

Embodiments of the present disclosure seek to provide encryption of data stored on volumes used by containers.

Embodiments of the present disclosure seek to provide flexibility to use the same datastore for encrypted and unencrypted volumes. In other words, with the present disclosure it is not necessary to encrypt the entire disk in order to encrypt data written to the disk.

Embodiments of the present disclosure seek to find a storage provider independent encryption logic, such that encrypted data may be used by multiple different containers, regardless of storage provider.

Embodiments of the present disclosure seek to provide a method to encrypt volumes that works with a container storage interface (CSI) irrespective of which storage provider is used and irrespective of whether the storage provider's CSI plugin supports encryption or not.

Embodiments of the present disclosure seek to encrypt volumes which are created in an environment where a container orchestrator (CO) uses a CSI to manage volumes and provides a way to mount encrypted volumes to different containers without the application needed to handle encryption/decryption (e.g., key management).

It is therefore one aspect of the present disclosure to provide a method and system of encrypting of data at rest on volumes that are managed by a CO using a CSI.

In existing solutions there is no storage provider independent way to encrypt stored data. Encryption provided by the storage provides then ties the service to a particular storage provider.

Any present-day solution that relies on the container orchestrator using a container storage interface for block device management does not provide storage provider independent encryption of the block device in such a manner that the block device may be used by multiple different nodes and/or containers. Encryption functionality that resides in the container storage interface is coupled with a particular storage provider.

An intermediate/encryption service that proxies the container storage interface service from the storage provider provides encryption of volumes. In some embodiments, the intermediate/encryption service comprises a CSI encryption proxy plugin implemented similar to the storage provider plugins. The intermediate service may use cryptsetup library to encrypt the volume. When a container orchestrator wants to create, attach, detach, delete, etc. a storage volume, the container orchestrator sends a remote procedure call (RPC) to the storage provider's container storage interface plugin, The container storage interface plugin executes the necessary logic to complete the requested operation (e.g., create, attach, detach, delete, etc.) and returns the storage volume details back to the container orchestrator. For example, the CSI plugin returns an object with information about the volume to the container orchestrator. In some examples, the object is defined by CSI specifications.

The intermediate service/encryption proxy plugin may intercept the RPC transferred to the container storage interface plugin. The encryption proxy plugin examines the RPC to determine if the data/volume requires encryption using one of the attributes from the request object (e.g., RPC). For example, a storage volume needs to be encrypted prior to a "NodeStageVolume" call. The CSI encryption plugin is deployed in the CO environment and intercepts the "NodeStageVolume" call. The CSI encryption plugin checks to see if the intercepted "NodeStageVolume" call requests encryption. For example, if the "NodeStageVolumeRequest.volume_context map" variable contains an attribute "encryptWithCSIProxy" with value of "true," then the request requires encryption. CSI encryption plugin encrypts the volume using the tools it deems fit (e.g., cryptsetup or veracrypt) and passes the "NodeStageVolume" call to the storage provider's CSI plugin.

In another example, part of a volume needs to be encrypted because the volume has been expanded. The RPC is "NodeExpandVolume," similar to above, the encryption proxy plugin intercepts the "NodeExpandVolume" call from the container orchestrator; and determines whether encryption is needed. For example, checking the volume present at "NodeExpandVolumeRequest.volume_path," the encryption plugin transfers the "NodeExpandVolume" request object to the storage provider's CSI plugin to expand the volume to the requested size. Once the storage provider expands the volume and the storage provider's CSI plugin returns "NodeExpandVolumeResponse," if the original (before expansion) volume was encrypted, then the encryption proxy encrypts the expanded portion of the volume using the proper tools before the "NodeExpandVolume" RPC is completed.

In some examples, the intermediate service creates a new passphrase and stores it (e.g., in Kubernetes the passphrase is stored as a secret). In other words, the intermediate service uses a container orchestrator object to store the passphrase. The intermediate service encrypts the data/volume using a suitable technique (e.g., cryptsetup library with plain dm-crypt or LUKS format) and passes the RPC to the container storage interface plugin. When a request to attach the volume to a different node is received, the intermediate service intercepts the request and makes sure the volume is accessible by the new node.

In some embodiments, a method of operating an intermediate service to perform encryption on a storage volume, the method comprising:

intercepting a request transferred from a container orchestrator to a container storage interface plugin;

transferring the intercepted request to the intermediate service;

examining the request to determine if encryption is needed;

in response to encryption being needed, encrypting the storage volume; and transferring the intercepted request to the container storage interface plugin.

The method, wherein the request comprises a remote procedure call.

The method, wherein the request comprises a request to create the storage volume.

The method, wherein the request comprises a request to attach the storage volume.

The method, wherein performing the encryption comprises performing the encryption using cryptsetup library.

The method, wherein performing the encryption comprising making the storage volume accessible to a node.

The method, wherein the storage volume comprises a persistent storage volume.

In some embodiments, an encryption proxy plugin to perform encryption on a storage volume, the encryption proxy plugin comprising:

a communication interface configured to intercept a request transferred from a container orchestrator to a container storage interface plugin;

a processor configured to examine the request to determine if encryption is needed;

in response to encryption being needed, the processor configured to encrypt the storage volume; and the communication interface configured to transfer the intercepted request to the container storage interface plugin.

The encryption proxy plugin, wherein the request comprises a remote procedure call.

The encryption proxy plugin, wherein the request comprises a request to create the storage volume.

The encryption proxy plugin, wherein the request comprises a request to attach the storage volume.

The encryption proxy plugin, wherein performing the encryption comprises performing the encryption using cryptsetup library.

The encryption proxy plugin, wherein performing the encryption comprising making the storage volume accessible to a node.

The encryption proxy plugin, wherein the storage volume comprises a persistent storage volume.

In some embodiments, a non-transitory computer readable medium having stored thereon instructions that, when executed by a processor perform a method to detect a duplicate address attack in a computing network, the method comprising:

intercepting a request transferred from a container orchestrator to a container storage interface plugin;

transferring the intercepted request to an encryption proxy plugin;

examining the request to determine if encryption is needed;

in response to encryption being needed, encrypting the storage volume; and transferring the intercepted request to the container storage interface plugin.

The non-transitory computer readable medium, wherein the request comprises a remote procedure call.

The non-transitory computer readable medium, wherein the request comprises a request to create the storage volume.

The non-transitory computer readable medium, wherein the request comprises a request to attach the storage volume.

The non-transitory computer readable medium, wherein performing the encryption comprises performing the encryption using cryptsetup library.

The non-transitory computer readable medium, wherein performing the encryption comprising making the storage volume accessible to a node.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NV RAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be a graph database as described herein. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

It should be appreciated that embodiments of the present disclosure can be utilized in numerous computing environments such as WIFI networks and multi-link subnet networks.

Furthermore, while the illustrative embodiments herein show the various components of a system collocated, it is to be appreciated that the various components of the system can be located at distant portions of a distributed network, such as a communication network and/or the Internet, or within a dedicated secure, unsecured, and/or encrypted system. Thus, it should be appreciated that the components of the system can be combined into one or more devices, such as an enterprise server or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
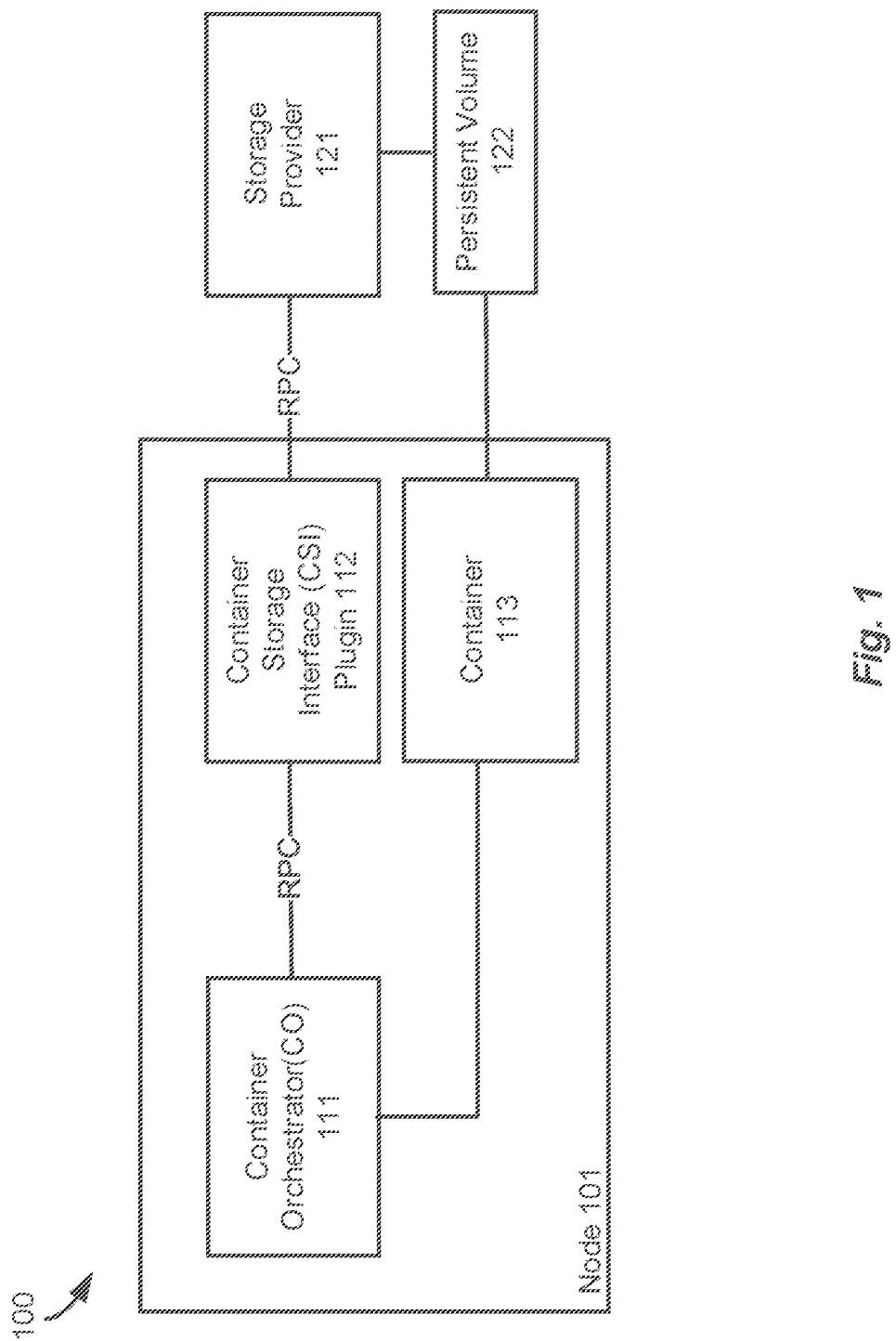
FIG. 1 illustrates a block diagram of a Container Storage Interface (CSI) implementation in accordance with embodiments of the present disclosure.

With reference initially to FIG. 1, an illustrative system 100 will be described in accordance with at least some embodiments of the present disclosure. The system 100 is shown to include a node 101 and a storage provider 121. The storage provider 121 stores a persistent volume 122. A container orchestrator (CO) 111, a container storage interface (CSI) plugin 112, and a container 113 are running on the node 101. For example, the container orchestrator 111 and the container storage interface plugin 112 are part of an application/process (not shown) running on the node 101. The application is stored in the container 113 on the node 101, and the container 113 stores the application with its own set of isolated resources. In some examples, the container orchestrator 111 is a Kubernetes system.

As shown in FIG. 1, the CO 111 transfers a request to the CSI plugin 112. The request may comprise a remote procedure call. For example, the request may be a request to publish the node volume and may be denoted by the request "NodePublishVolumeRequest." The CSI plugin 112 allows the CO 111 to interface with the storage provider 121. Container 113 may access the persistent volume 122.

In accordance with at least some embodiments of the present disclosure, the various components may communicate over a communication network not shown for clarity. The communication network may comprise any type of known communication medium or collection of communication media and may use any type of protocols to transport messages between endpoints. The communication network may include wired and/or wireless communication technologies. The Internet is an example of a communication network that constitutes an Internet Protocol (IP) network comprising many computers, computing networks, and other communication devices located all over the world, which are connected through many telephone systems and other means. Other examples of communication networks include, without limitation, a standard Plain Old Telephone System (POTS), an Integrated Services Digital Network (ISDN), the Public Switched Telephone Network (PSTN), a LAN, a WAN, a Session Initiation Protocol (SIP) network, a Voice over IP (VoIP) network, a cellular network, an enterprise network, and any other type of packet-switched or circuit-switched network known in the art. In addition, it can be appreciated that communication network need not be limited to any one network type, and instead may be comprised of a number of different networks and/or network types. Moreover, communication network may comprise a number of different communication media such as coaxial cable, copper cable/wire, fiber-optic cable, antennas for transmitting/receiving wireless messages, and combinations thereof.

Figure 2:
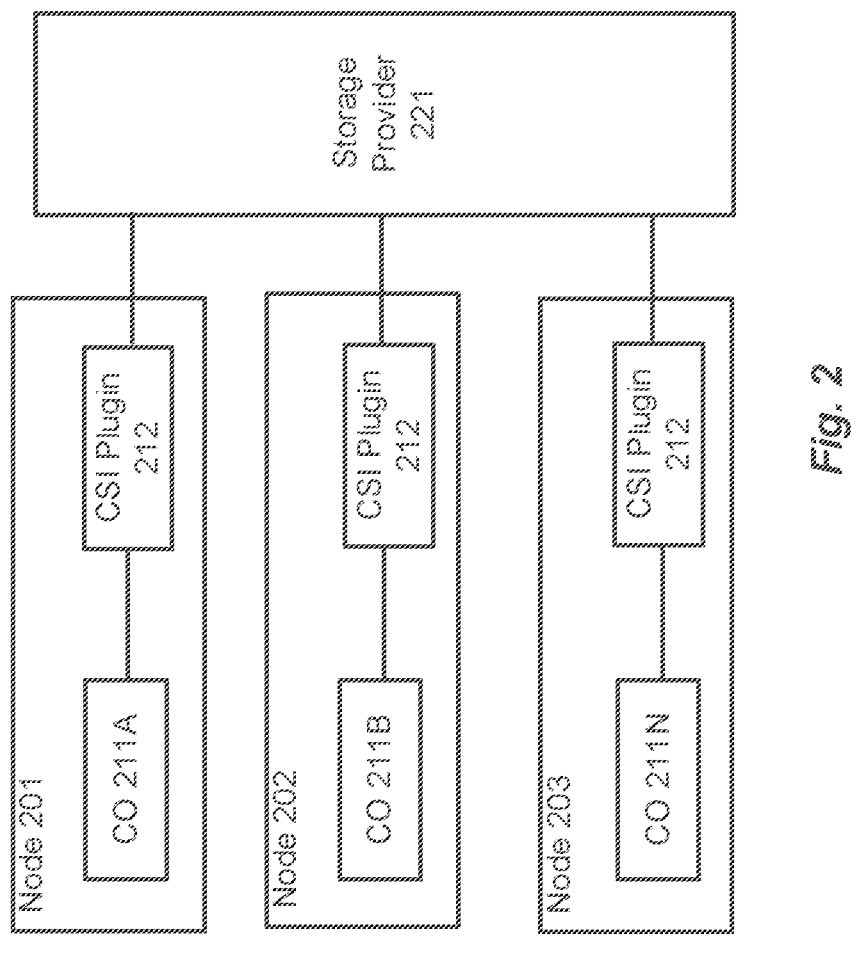
FIG. 2 illustrates a block diagram of multiple nodes to a single storage provider with CSI implementation in accordance with embodiments of the present disclosure.

FIG. 2 illustrates a system 200 that includes nodes 201-203 and a storage provider 221. For example, each node 201-203 is running a container orchestrator (CO) 211A-211N, respectively and a container storage interface (CSI) plugin 212, and one or more containers, which are not shown for clarity. The containers access data stored on storage provided by the storage provider 221. If, for example, the data stored by the storage provider 221 is encrypted, each node 201-203/CO 211A-211N would need to be able to encrypt/decrypt the data. As illustrated in FIG. 2, the storage provider 221 may use the same CSI plugin 212 to interact with multiple different container orchestrators CO 211A-211N.

Figure 3:
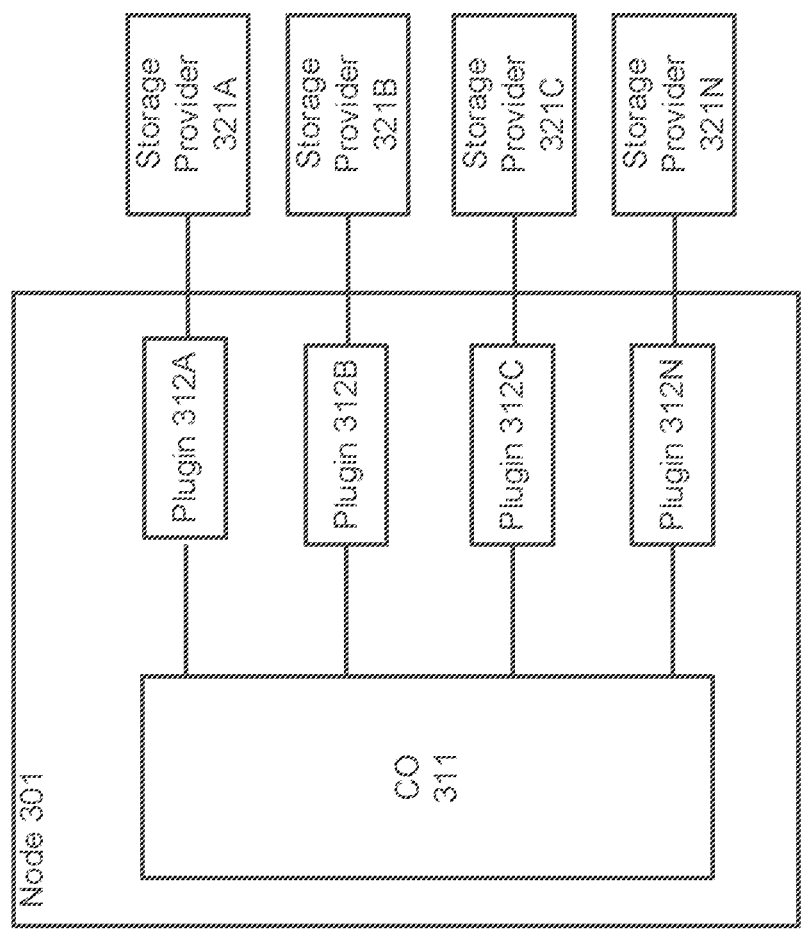
FIG. 3 illustrates a block diagram where a single container orchestrator interacts with multiple storage providers' CSI plugins in accordance with embodiments of the present disclosure.

Conversely, a container orchestrator (CO) 311 may interact with multiple different storage providers 321A-321N, where each storage provider 321A-321N has its own CSI plugin 312A-312N to interact with CO 311 on a node 301, as illustrated in FIG. 3. Each storage provider 321A-321N may use their own encryption methods.

Figure 4:
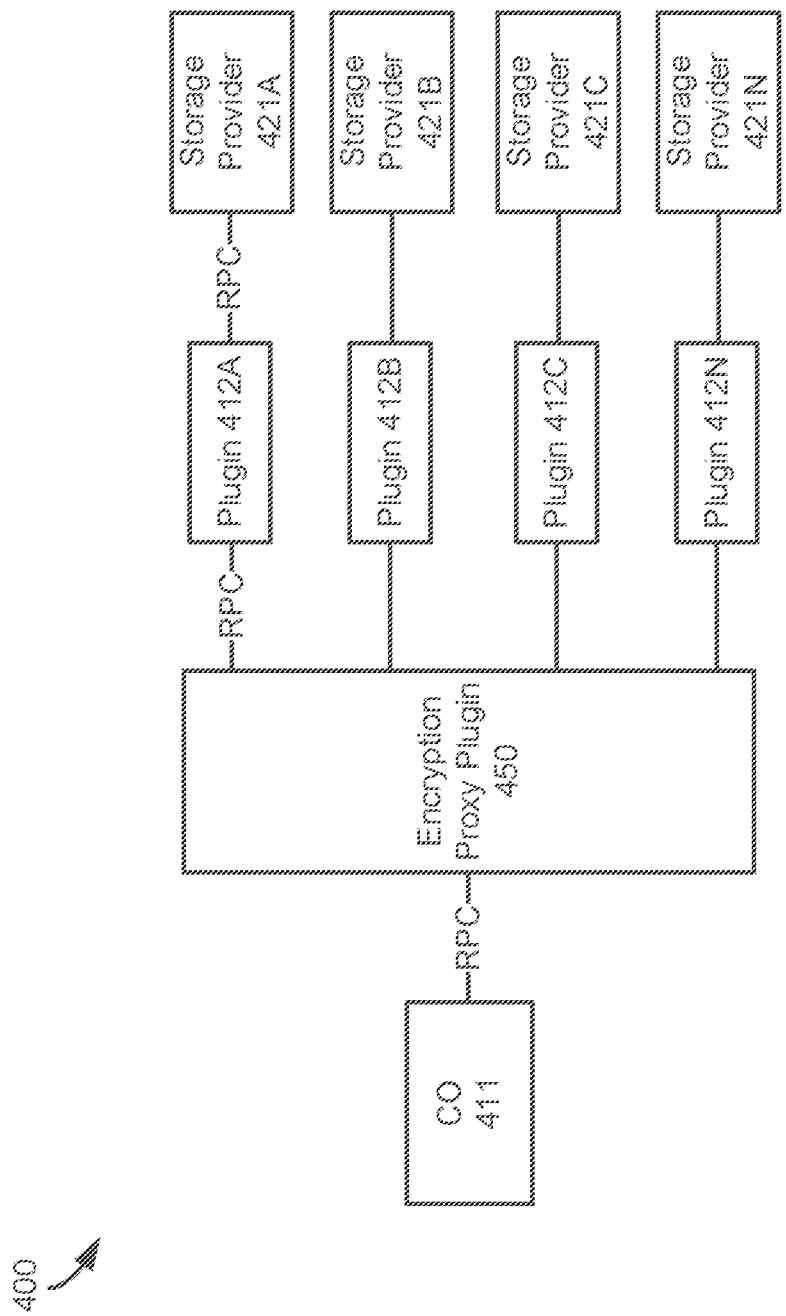
FIG. 4 illustrates a block diagram with a CSI encryption plugin implementation in accordance with embodiments of the present disclosure.

FIG. 4 illustrates a system 400 including an encryption proxy plugin 450 that provides encryption of data stored by the storage providers 421A-421N. For example, a CO 411 sends an RPC to the storage provider 421A. In traditional operation, the RPC would be sent to the storage provider 421A via a CSI plugin 412A. The encryption proxy 450 intercepts the RPC before it is transmitted to the CSI plugin 412A. In some embodiments, whether to perform encryption related operations before or after the call to the CSI plugin 412A is decided on a case by case basis by encryption proxy plugin 450.

After the encryption proxy plugin 450 intercepts the RPC, the encryption proxy plugin 450 examines the request to determine if encryption is needed. If encryption is needed, for example, the call is to create a new encrypted volume, then the encryption proxy plugin 450 passes the intercepted RPC to the appropriate CSI plugin (e.g., the CSI plugin 412A). Once the storage provider 421A creates the new volume, the CSI plugin 412A passes a response to the CO 411, the response is intercepted by the encryption proxy plugin 450, and the encryption proxy plugin 450 encrypts the new volume. Once the encryption is complete, the encryption proxy plugin 450 returns the completed request to the CO 411. If encryption is not needed, then the response transferred from the CSI plugin 412A is passed to the CO 411 without further action.

Figure 5:
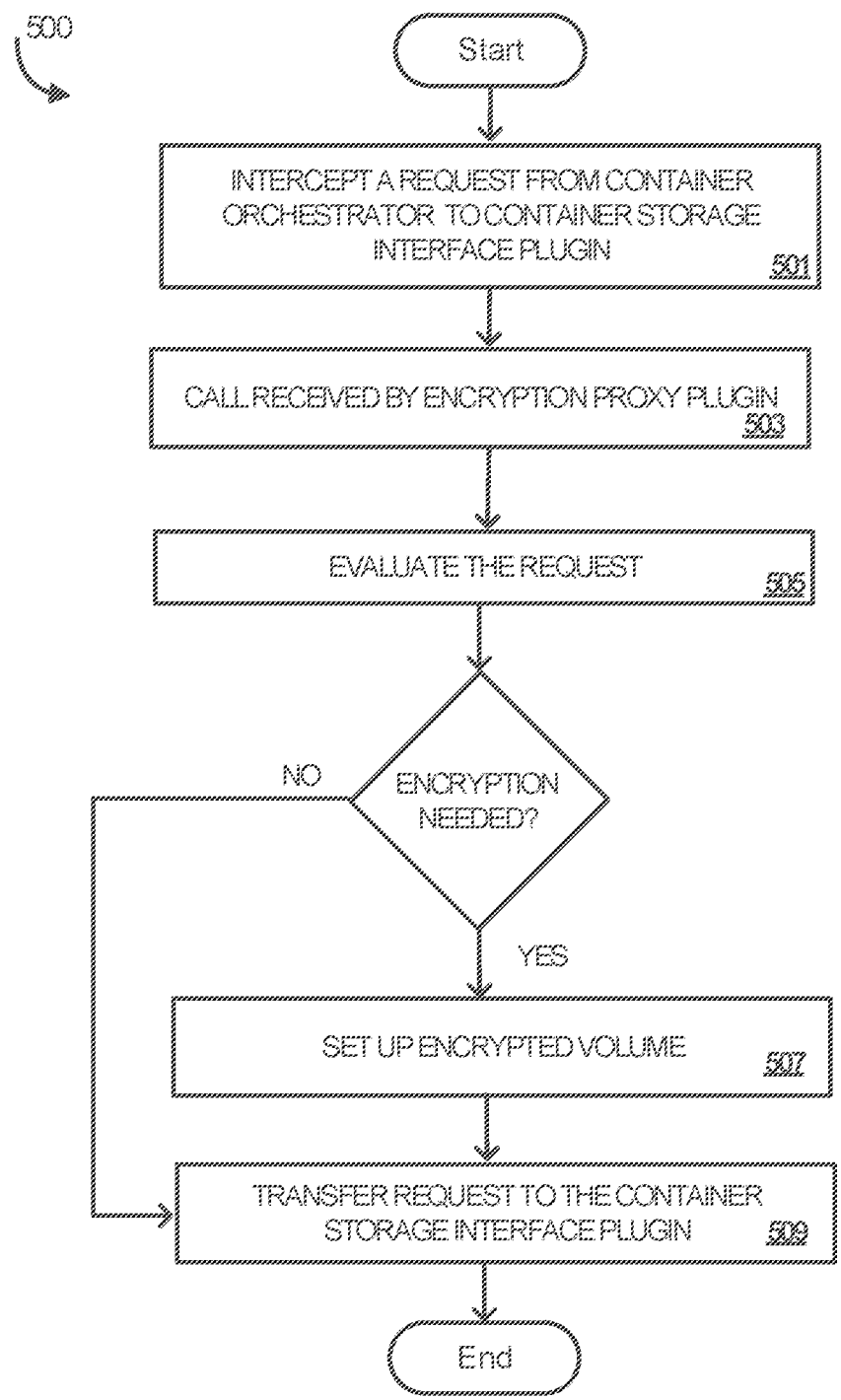
FIG. 5 is a flow diagram depicting a process to provide encryption of data stored on volumes used by containers in accordance with embodiments of the present disclosure.

FIG. 5 illustrates an example flow of process 500 to provide encryption of data at rest for the data used in containers. The processes of operation 500 are referenced parenthetically in the paragraphs that follow, along with references to the elements and systems from system 400 of FIG. 4. It is not required to perform the steps in a particular order.

As illustrated in FIG. 5, operation 500 starts, in step 501 a request from the CO 411 to at least one of storage providers 421A-421N is intercepted by the encryption proxy plugin 450. In some examples, the request comprises a remote procedure call. The intercepted call is received by the encryption proxy plugin 450 (step 503). The encryption proxy plugin 450 evaluates the request (step 505) and determines whether encryption is needed. For example, the encryption proxy plugin 450 may evaluate the attributes of the request to determine if encryption is needed. If encryption is not needed (No), the request is transferred to the appropriate the CSI plugin 412A-412N (step 509) and the process 500 ends.

If encryption is needed (Yes), the encryption proxy plugin 450 performs the encryption (step 507). In some examples, encryption may be performed after a response is received from the storage provider's CSI plugin. For instance, if the request is to create a new volume, the encryption is performed after the storage provider creates the new volume and returns a response to the create volume request. For example, the encryption proxy plugin 450 may use cryptsetup library to encrypt the data. In some examples, if the volume is already encrypted by the encryption proxy, it is unlocked for access by a container if container provides the correct passphrase. In some examples, if the CO 411 is a Kubernetes system, the passphrase is stored as a secret. The encryption proxy plugin 450 transfers the request to the CSI plugin 412A-412N (request may be transferred to one or more CSI plugin 412A-412N), and the process 500 ends.

Figure 6:
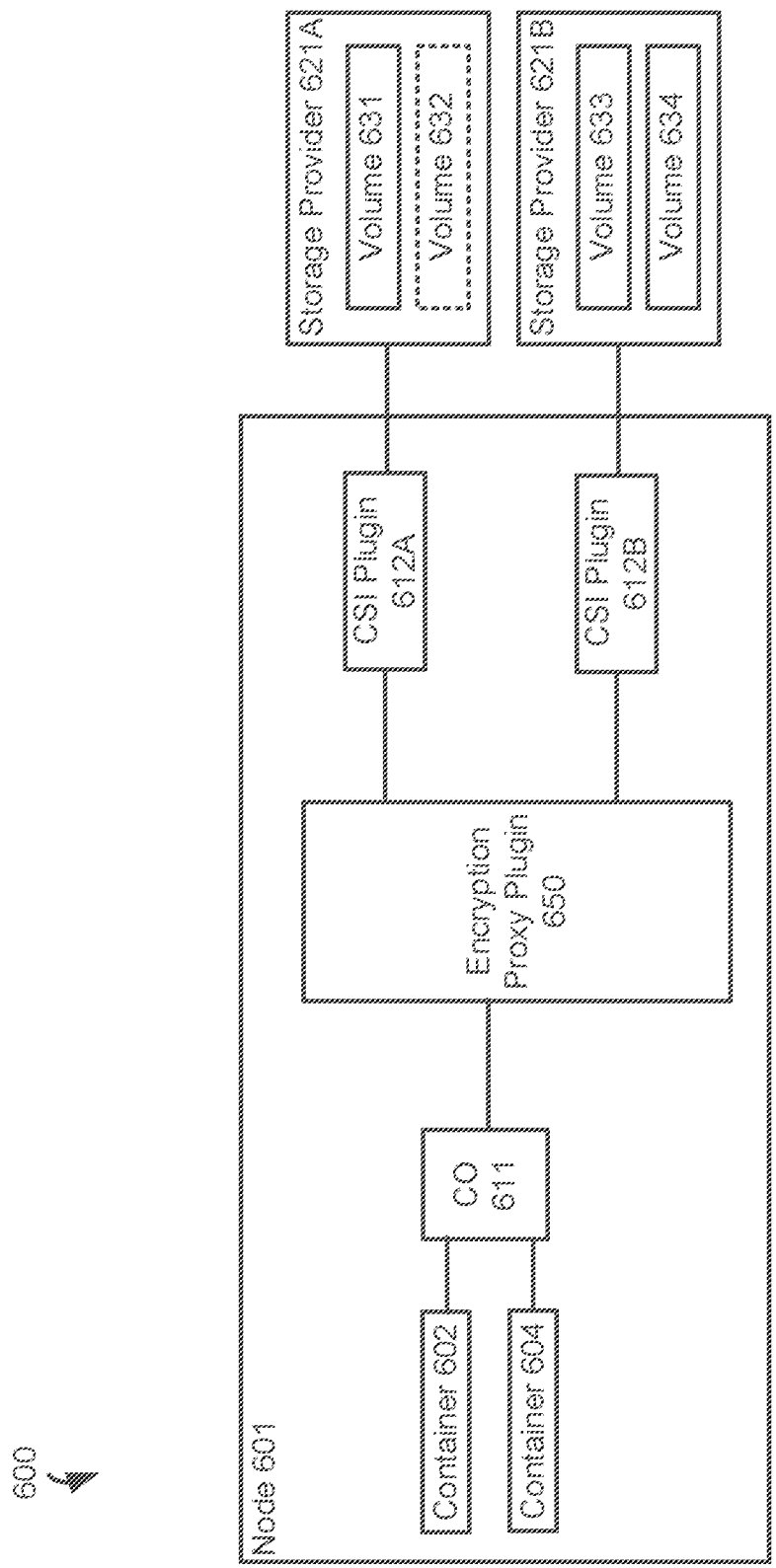
FIG. 6 illustrates a block diagram with a CSI encryption plugin implementation in accordance with embodiments of the present disclosure.

FIG. 6 illustrates a system 600 in accordance with at least some embodiments of the present disclosure. FIG. 6 includes a node 601 and storage providers 621A-621B. The node 601 runs containers 602 and 604, a container orchestrator (CO) 611, an encryption proxy plugin 650, and CSI plugins 612A-612B. The storage provider 621A stores volumes 631 and 632, where volume 632 is encrypted as illustrated with the dotted line. The storage provider 621B stores volumes 633 and 634. The CO 611 communicates with the storage provider 621A via a CSI plugin 612A. The CO 611 communicates with the storage provider 621B via a CSI plugin 612B.

For example, the CO 611 sends an RPC to the storage provider 621A via the plugin 612A. As an illustrative example, the container 602 needs to mount the volume 631. The CO 611 invokes a "NodeStageVolume" RPC intended for the CSI plugin 612A. The encryption proxy plugin 650 intercepts the "NodeStageVolume" call, and checks if encryption is requested using an attribute in the RPC request. As illustrated, the volume 631 is not encrypted, so encryption is not needed/requested in this example. The encryption proxy plugin 650 forwards the "NodeStageVolume" call to the plugin 612A, which mounts the volume 631 as requested and returns a response. The encryption proxy plugin 650 passes the response back to the CO 611.

In another example, the container 604 needs to mount the volume 632. The CO 611 invokes a "NodeStageVolume" RPC intended for the CSI plugin 612A. The encryption proxy plugin 650 intercepts the "NodeStageVolume" call, and checks if encryption is requested using an attribute in the RPC request. As illustrated, encryption for the volume 632 is requested in this example. The encryption proxy plugin 650 intercepts the response from the CSI plugin 612A. The encryption proxy 650 retrieves the passphrase and encrypts the volume 632. (Using tools like cryptsetup, veracrypt etc.)

The encryption proxy 650 also checks if the volume was already encrypted and if so, it is unlocked using the passphrase. Once the encryption of volume or opening of volume is complete, the encryption proxy plugin 650 forwards the "NodeStageVolume" call to the CSI plugin 612A, which mounts the volume 632 as requested and returns a response. The encryption proxy plugin 650 forwarding the call may comprise creating a new similar RPC. The encryption proxy plugin 650 passes the response back to the CO 611.

Figure 7:
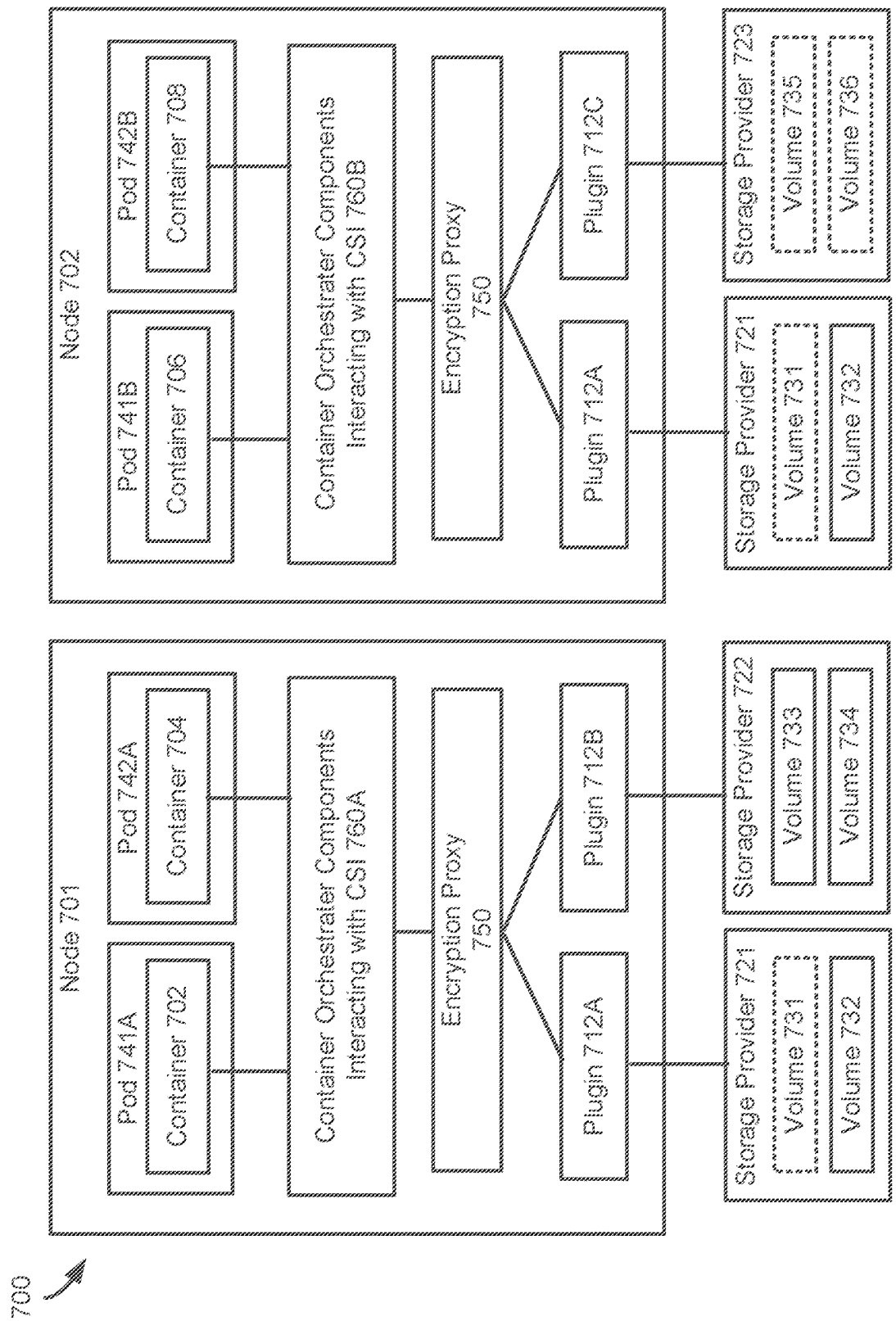
FIG. 7 illustrates a block diagram with a CSI encryption plugin implementation in accordance with embodiments of the present disclosure.

With reference to FIG. 7, an illustrative system 700 will be described in accordance with at least some embodiments of the present disclosure. The system 700 is shown to include nodes 701-702 and storage providers 721-723. The storage provider 721 stores volumes 731 and 732, where the volume 731 is encrypted as illustrated by the dotted lines around the volume 731. The storage provider 722 stores volumes 733 and 734. The storage provider 723 stores volumes 735 and 736, which are both encrypted, although the storage provider 723 may store unencrypted volumes as well.

The node 701 includes pods 741A-742A, container orchestrator (CO) components 760A, an encryption proxy 750, and CSI plugins 712A and 712B. The pod 741A includes a container 702. The pod 742A includes a container 704. The CSI plugin 712A communicates with the storage provider 721. The CSI plugin 712B communicates with the storage provider 722. Node 702 includes pods 741B-742B, container orchestrator (CO) components 760B, the encryption proxy 750, and CSI plugins 712A and 712C. The pod 741B includes a container 706. The pod 742B includes a container 708. The CSI plugin 712A communicates with the storage provider 721. The CSI plugin 712C communicates with the storage provider 723. As illustrated, the encryption proxy 750 comprises a service/process that may be added to a node when encryption is needed. The encryption proxy 750 is storage provider independent and may be used with multiple different storage providers 721-723 and/or multiple different containers 702, 704, 706, and/or multiple different COs 760A-760B.

For example, the container 702 sends a request to the CO 760A for a volume 731-732 to be mounted at certain path, so the CO 760A sends an RPC to the storage provider 721. The encryption proxy 750 intercepts the RPC before it is transmitted to the CSI plugin 712A. The encryption proxy 750 examines the request to determine if encryption is needed based on the CSI request object. For example, the encryption proxy 750 may retrieve a passphrase and encrypt the requested volume. Once completed, the encryption proxy 750 transfers the RPC to the CSI plugin 712A for communication to the storage provider 721.

For example, the container 704 sends a request to the CO 760A for a volume 733-734 to be mounted at certain path, so the CO 760A sends an RPC to the storage provider 722. The encryption proxy 750 intercepts the RPC before it is transmitted to the CSI plugin 712B. The encryption proxy 750 examines the request to determine if encryption is needed. If encryption is not needed, then the RPC is transferred to the CSI plugin 712B without further action.

Figure 8:
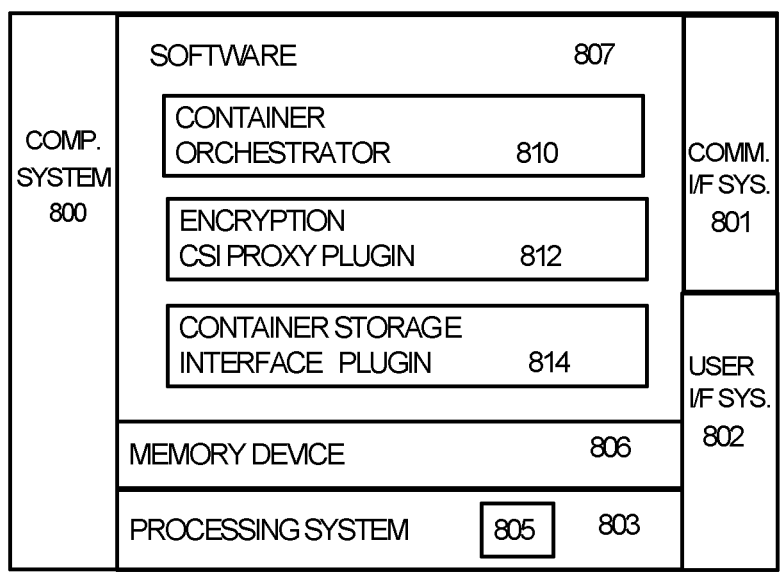
FIG. 8 is a block diagram of a computer used to implement the method to encrypt data at rest on disks that are managed by a container orchestrator using a container storage interface in accordance with embodiments of the present disclosure.

FIG. 8 illustrates a computing system 800 used to encrypt data at rest on disks/volumes that are managed by a container orchestrator (CO) using a container storage interface (CSI) as described herein, according to one implementation. Similar computing systems may be included in the nodes 101, 201-203, 301, 601, and 701-702 described herein used to encrypt data accessed by containers. The computing system 800 is representative of any computing system or systems with which the various operational architectures, processes, scenarios, and sequences disclosed herein for running an intermediate/encryption proxy for providing encryption to data used in containers.

The computing system 800 comprises a communication interface 801, a user interface 802, and a processing system 803. The processing system 803 is linked to the communication interface 801 and the user interface 802. The processing system 803 includes a microprocessor and/or processing circuitry 805 and a memory device 806 that stores operating software 807. The computing system 800 may include other well-known components such as a battery and enclosure that are not shown for clarity. The computing system 800 may comprise a server, a host, a user device, a desktop computer, a laptop computer, a tablet computing device, virtual machine, cloud computing device, or some other computing apparatus.

The communication interface 801 comprises components that communicate over communication links, such as network cards, ports, radio frequency (RF), processing circuitry and software, or some other communication devices. The communication interface 801 may be configured to communicate over metallic, wireless, or optical links. The communication interface 801 may be configured to use Time Division Multiplex (TDM), Internet Protocol (IP), Ethernet, optical networking, wireless protocols, communication signaling, or some other communication format—including combinations thereof. In some implementations, the communication interface 801 is configured to communicate with other devices, wherein the communication interface is used to transfer and receive data communications for the devices.

The user interface 802 comprises components that interact with a user to receive user inputs and to present media and/or information. The user interface 802 may include a speaker, microphone, buttons, lights, display screen, touch screen, touch pad, scroll wheel, communication port, or some other user input/output apparatus—including combinations thereof. The user interface 802 may be omitted in some examples.

The processing circuitry 805 comprises a microprocessor and other circuitry that retrieves and executes the operating software 807 from the memory device 806. The memory device 806 may include volatile and nonvolatile, removable and non-removable media implemented in any method or technology for storage of information, such as computer readable instructions, data structures, program modules, or other data. The memory device 806 may be implemented as a single storage device, but may also be implemented across multiple storage devices or sub-systems. The memory device 806 may comprise additional elements, such as a controller to read the operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

The processing circuitry 805 is typically mounted on a circuit board that may also hold the memory device 806 and portions of the communication interface 801 and the user interface 802. The operating software 807 comprises computer programs, firmware, or some other form of machine-readable program instructions. The operating software 807 includes a container orchestrator (CO) 810, an encryption CSI proxy plugin 812, and a container storage interface (CSI) plugin 814, although any number of software modules within the application may provide the same operation. The operating software 807 may further include an operating system, utilities, drivers, network interfaces, applications, or some other type of software. When executed by the processing circuitry 805, the operating software 807 directs the processing system 803 to operate the computing system 800 as described herein.

In at least one implementation, the CO 810, when read and executed by the processing system 803, directs the processing system 803 to manage containers and associated resources. The encryption CSI proxy plugin 812, when read and executed by the processing system 803, directs the processing system 803 to encrypt data as described herein. The CSI plugin 814, when read and executed by the processing system 803, directs the processing system 803 to communicate requests to the storage provider.

It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system that executes a method of operating an intermediate service to perform encryption on a storage volume, the system comprising:
    a processor; and
    memory including one or more instructions that when executed by the processor cause the processor to:
        intercept a request transferred from a container orchestrator to a container storage interface plugin;
        transfer the intercepted request to the intermediate service;
        examine the request to determine if encryption is needed;
    in response to encryption being needed:
        transfer the intercepted request to the container storage interface plugin;
        intercept a response from the container storage interface plugin to the container orchestrator; and
        perform encryption on the storage volume.

2. The system of claim 1, wherein the request comprises a remote procedure call.

3. The system of claim 1, wherein the request comprises a request to create the storage volume.

4. The system of claim 1, wherein the request comprises a request to attach the storage volume.

5. The system of claim 1, wherein performing the encryption comprises performing the encryption using cryptsetup library.

6. The system of claim 1, wherein performing the encryption comprising making the storage volume accessible to a node.

7. The system of claim 1, wherein the storage volume comprises a persistent storage volume.

8. A hardware encryption proxy component to perform encryption on a storage volume, the hardware encryption proxy component comprising:
    a communication interface configured to intercept a request transferred from a container orchestrator to a container storage interface plugin;
    a processor configured to examine the request to determine if encryption is needed;
    in response to encryption being needed,
    the communication interface configured to transfer the intercepted request to the container storage interface plugin and to intercept a response from the container storage interface plugin to the container orchestrator; and the processor configured to encrypt the storage volume.

9. The hardware encryption proxy component of claim 8, wherein the request comprises a remote procedure call.

10. The hardware encryption proxy component of claim 8, wherein the request comprises a request to create the storage volume.

11. The hardware encryption proxy component of claim 8, wherein the request comprises a request to attach the storage volume.

12. The hardware encryption proxy component of claim 8, wherein performing the encryption comprises performing the encryption using cryptsetup library.

13. The hardware encryption proxy component of claim 8, wherein performing the encryption comprising making the storage volume accessible to a node.

14. The hardware encryption proxy component of claim 8, wherein the storage volume comprises a persistent storage volume.

15. A non-transitory computer readable medium having stored thereon instructions that, when executed by a processor, perform a method of operating an intermediate service to perform encryption on a storage volume, the method comprising:

intercepting a request transferred from a container orchestrator to a container storage interface plugin;

transferring the intercepted request to an encryption proxy plugin;

examining the intercepted request to determine if encryption is needed;

in response to encryption being needed:

transferring the intercepted request to the container storage interface plugin;

intercepting a response from the container storage interface plugin to the container orchestrator; and performing encryption on the storage volume.

16. The non-transitory computer readable medium of claim 15, wherein the request comprises a remote procedure call.

17. The non-transitory computer readable medium of claim 15, wherein the request comprises a request to create the storage volume.

18. The non-transitory computer readable medium of claim 15, wherein the request comprises a request to attach the storage volume.

19. The non-transitory computer readable medium of claim 15, wherein performing the encryption comprises performing the encryption using cryptsetup library.

20. The non-transitory computer readable medium of claim 15, wherein performing the encryption comprises making the storage volume accessible to a node.

\* \* \* \* \*